R. SCHERER.
NUT LOCK.
APPLICATION FILED APR. 3, 1908.
923,082.
Patented May 25, 1909.
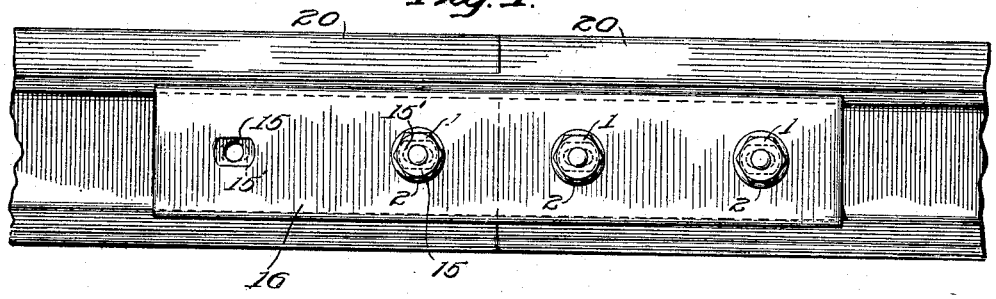
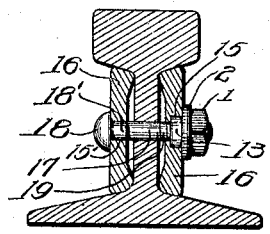
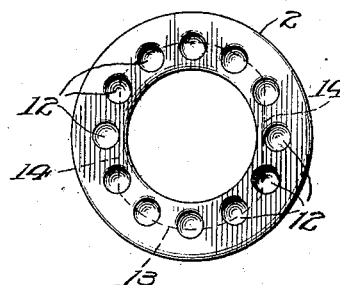
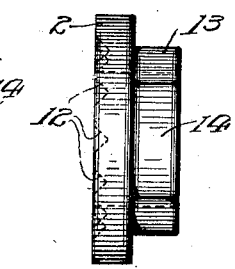
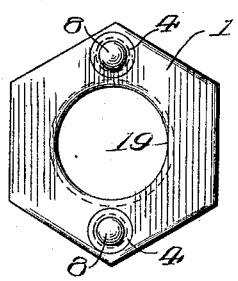
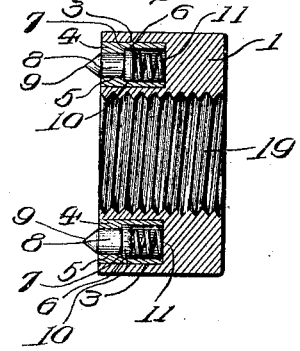
INVENTOR
Robert Scherer.
WITNESSES
BY
ATTORNEY

UNITED STATES PATENT OFFICE.

ROBERT SCHERER, OF NORRISTOWN, PENNSYLVANIA, ASSIGNOR OF ONE-HALF TO CHRISTIAN P. ROMEIS, OF BRIDGEPORT, PENNSYLVANIA.

NUT-LOCK.

No. 923,082.   Specification of Letters Patent.   Patented May 25, 1909.

Application filed April 3, 1908. Serial No. 424,943.

*To all whom it may concern:*

Be it known that I, ROBERT SCHERER, a citizen of the United States, and a resident of Norristown, county of Montgomery, and State of Pennsylvania, have invented certain new and useful Improvements in Nut-Locks, of which the following is a full, clear, and exact description, reference being had to the accompanying drawings, forming a part of this specification.

The main objects of my invention are: to provide a simple and durable nut lock which will be cheap to manufacture, easy to operate, and strong and durable in action; to provide a nut lock which, while holding the nut rigid against accidental displacement, will permit of the easy and convenient adjustment of the nut when desired; to provide a nut lock which will be carried concealed by the nut and which will be always in position ready for use; and to provide a nut lock which will be particularly suitable for use in combination with fish plates in rail joints.

With these and other objects in view the invention consists of the construction hereinafter set forth.

In the accompanying drawings Figure 1 is a side elevation of a rail joint showing the application of a nut lock constructed in accordance with this invention; Fig. 2 a transverse vertical section of the same; Fig. 3 a face view of the washer forming a part of this invention; Fig. 4 a side elevation of the washer; Fig. 5 an elevation of the inner end of the nut and Fig. 6 a longitudinal section of the nut.

Referring to the drawings, the device comprises a nut 1, of standard dimensions which may be constructed to fit standard bolts of any size and a washer 2 which is specially constructed in accordance with this invention to coöperate with the nut and with a fish plate of a rail joint or with any other suitable base.

The nut 1 is provided upon its inner face with cylindrical recesses 3 extending longitudinally of the nut and upon opposite sides thereof at equal distances from the axis of the nut. Two such recesses are herein shown although only one is absolutely necessary and any number may be used. Within each of these recesses 3 is tightly fitted a bushing 4 provided with a central bore 5, the inner end of the bore being enlarged as at 6 to form an inwardly facing annular shoulder 7. Within the bore 5 of the bushing is slidably mounted a pin or catch 8 having its outer end tapered to form a conical point 9 and its inner end enlarged to form a head 10 which rests within the inner enlarged portion of the bore and is adapted to engage against the inwardly facing shoulder 7 thereof. The head of the pin or catch 8 is pressed outwardly against the shoulder of the bore by means of the spiral spring 11 which is interposed between the head of the pin and the opposite end of the recesses 3 of the nut.

The washer 2 is provided upon its face side with counter-sunk recesses 12 spaced uniformly in a circle concentric with the washer and of a radius equal to the radius of the points of the pins 8 from the center of the nut, and the pins are so spaced upon the nut that when the nut and the washer are brought together, the pins simultaneously engage corresponding recesses of the washer.

To prevent the washer from turning upon its seat, the inner end 13 of the washer is reduced and provided with flattened sides 14, the reduced end being proportioned to fit closely in the elongated apertures 15 of the fish plates 16, the flattened sides of the washer engaging against the flattened sides of the aperture.

The bolt 17 used in this construction is of standard size and shape, being provided at one end with a head 18 and having the shank portion 18' of the bolt adjacent the head enlarged and flattened to fit in elongated apertures 15' of the fish plates to prevent the bolt from turning, and having screw threads 19 upon the opposite end of the bolt adapted to engage with the corresponding screw threads of the nut. Through this description it is evident that when the bolt 17 is in position through the fish plates and rail end 20 and the washer 2 is seated over the bolt in the aperture 15 of the fish plate and when the nut is threaded on the bolt and brought into engagement with the recessed face of the washer that the spring pressed pins or catches 8 of the nut will snap into engagement in the recesses 12 in the washer; and owing to the conical shape of the pins and of the recesses of the washer the pins will yield against the force of their springs to permit the nut to be easily and readily rotated, when desired, by means of a wrench; but when in engagement in the recesses of the washer the pins will hold the nut against any ordinary force such as would accidentally be brought to bear to displace the nut.

Although I have shown only one form in which this invention may be constructed, it is evident that many changes might be made in the details of the construction, within the scope of the appended claims, without departing from the spirit of this invention, or sacrificing any of the advantages thereof.

Having thus fully described my invention, I claim and desire to protect by Letters Patent of the United States:

1. A nut lock comprising a nut having a recess upon the inner face and extending parallel to the axis thereof part way only through said nut, a bushing fitting tightly in said recess having a central bore, said bore being enlarged at its inner end to form an annular shoulder, a pin slidably mounted in said bore having its inner end enlarged to form a head which rests within the inner enlarged portion of the bore and is adapted to engage against the annular shoulder of the bushing, and having its outer end tapered to form an engaging point, a spring interposed between the head of the pin and the opposite end of the recess of the nut and a fixed seat for said nut having a recess adapted to be engaged by said pin.

2. A nut lock comprising a nut having a recess upon the inner face and extending parallel to the axis thereof part way only through said nut, a bushing fitting tightly in said recess having a central bore, said bore being enlarged at its inner end to form an annular shoulder, a pin slidably mounted in said bore having its inner end enlarged to form a head which rests within the inner enlarged portion of the bore and is adapted to engage against the annular shoulder of the bushing, and having its outer end tapered to form an engaging point, a spring interposed between the head of the pin and the opposite end of the recess of the nut, a bolt extending through said nut and a washer upon said bolt adjacent and upon the inside of said nut, said washer having means to prevent the turning thereof and being provided with a recess adapted to be engaged by said pin.

3. In a nut lock, the combination with a bolt having means adjacent the head thereof to prevent the bolt from turning, a nut upon said bolt provided with a recess upon the inner face thereof extending in a direction parallel to the axis of the nut and only part way through the nut, a bushing fitting tightly in said recess and having its outer surface flush with the inner surface of the nut, said bushing having a central bore enlarged at its inner end to form an annular shoulder, a pin in said bore having its inner end enlarged to form a head fitting in the enlarged portion of said bore and its outer end tapered to form an engaging point projecting from the inner face of said nut, a spring between the head of said pin and the opposite end of said recess, and a washer upon said bolt, said washer being provided upon its face side with spaced recesses adapted to be engaged by said pin and the inner end of said washer being reduced and provided with flattened sides for holding said washer against turning.

In witness whereof, I have hereunto set my hand this first day of April, A. D. 1908.

ROBERT SCHERER.

Witnesses:
ALEXANDER PARK,
A. I. GARDNER.